INVENTOR.
FRANK W. GUTZWILLER
HIS ATTORNEY

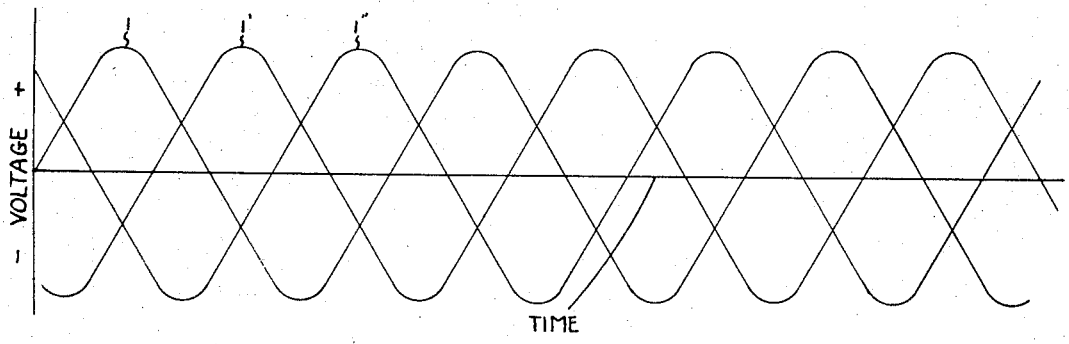
FIG. 2ᵃ
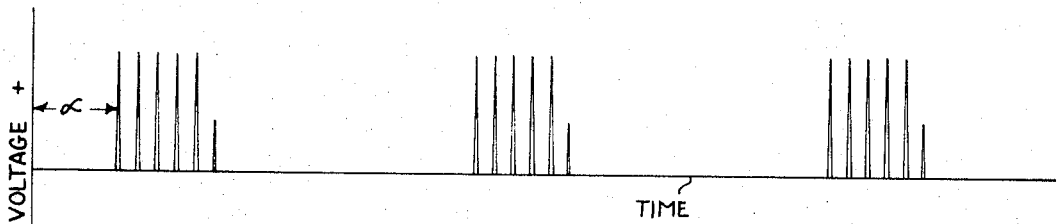
FIG. 2ᵇ
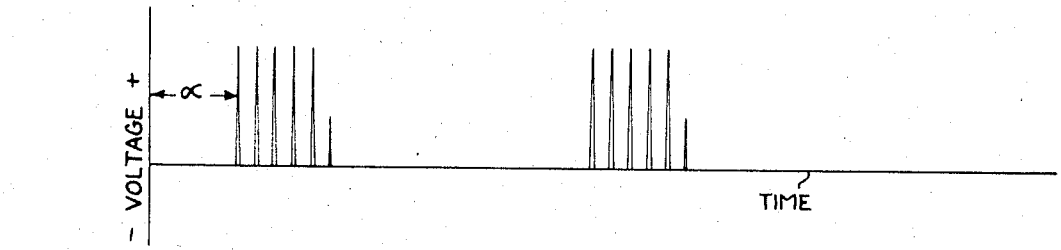
FIG. 2ᶜ
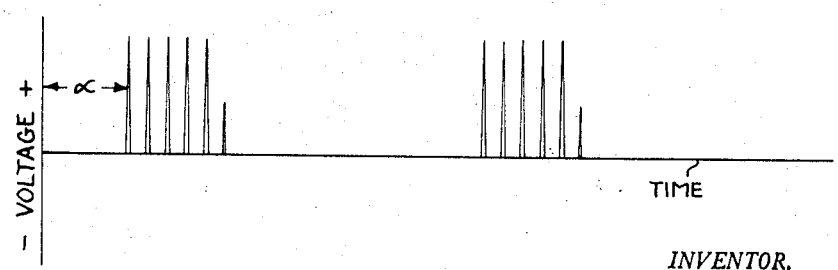
FIG. 2ᵈ

United States Patent Office 3,437,911
Patented Apr. 8, 1969

3,437,911
CONTROL CIRCUIT FOR CONTROLLING THE POWER TO AN INDUCTIVE LOAD FROM A POLYPHASE SOURCE
Frank W. Gutzwiller, Auburn, N.Y., assignor to General Electric Company, a corporation of New York
Filed Apr. 25, 1966, Ser. No. 545,118
Int. Cl. G05f 1/40, 1/52; H02m 3/08
U.S. Cl. 323—22            10 Claims

ABSTRACT OF THE DISCLOSURE

A controlled rectifier circuit is provided for controllably supplying power to an inductive load. Trigger circuit means is coupled to a controlled rectifier for controlling the point during each input voltage cycle at which the controlled rectifier is to be fired. The trigger circuit includes means for generating a phase controlled train of pulses in response to the source voltage. It further includes means for coupling the train of pulses to the gate circuit of the controlled rectifier, the last-mentioned means and the gate circuit being so constructed and arranged that the power for the gate circuit is derived solely from the train of pulses.

---

This invention relates to semiconductor phase control circuits for controlling power supplied to a load by means of controlled rectifiers, and, more specifically, to phase control circuits of the type described which control power supplied to an inductive load.

Prior art circuits used in the past to control the amount of power supplied from a source to an inductive load by means of controlled rectifiers comprise a trigger circuit which is coupled through a pulse transformer to a pilot silicon-controlled rectifier in the gate circuit of the controlled rectifier. These circuits provide a continuous gate current for the controlled rectifier while the current flow through the inductive load builds up to the holding current level of the controlled rectifier. These circuits have used bulky, expensive isolation transformers to step down the input voltage level to the gate circuit while providing the pilot silicon-controlled rectifiers with a source of power. Furthermore, an isolation transformer was also often used to step down the voltage level to the trigger circuit and to form a common neutral point for the simultaneous control of a plurality of trigger circuits.

It is an object of this invention to provide an improved, inexpensive controlled rectifier circuit, for controlling the power supplied to an inductive load, which does not need a power-line frequency isolation transformer for the gate circuit of the controlled rectifier.

It is a further object of this invention to establish a common neutral point for a plurality of trigger circuits for controlled rectifiers without the use of an isolation transformer.

Briefly stated, and in accordance with one aspect of this invention, a controlled rectifier circuit is provided for controllably supplying power to an inductive load. Trigger circuit means is coupled to a controlled rectifier for controlling the point during each input voltage cycle at which the controlled rectifier is to be fired. The trigger circuit includes means for generating a phase controlled train of pulses in response to the source voltage. It further includes means for coupling the train of pulses to the gate circuit of the controlled rectifier, the last-mentioned means and the gate circuit being so constructed and arranged that the power for the gate circuit is derived solely from the train of pulses.

FIGURE 2 is a voltage wave diagram used in explaining the operation of the circuit shown in FIGURE 1.

Figure 1:
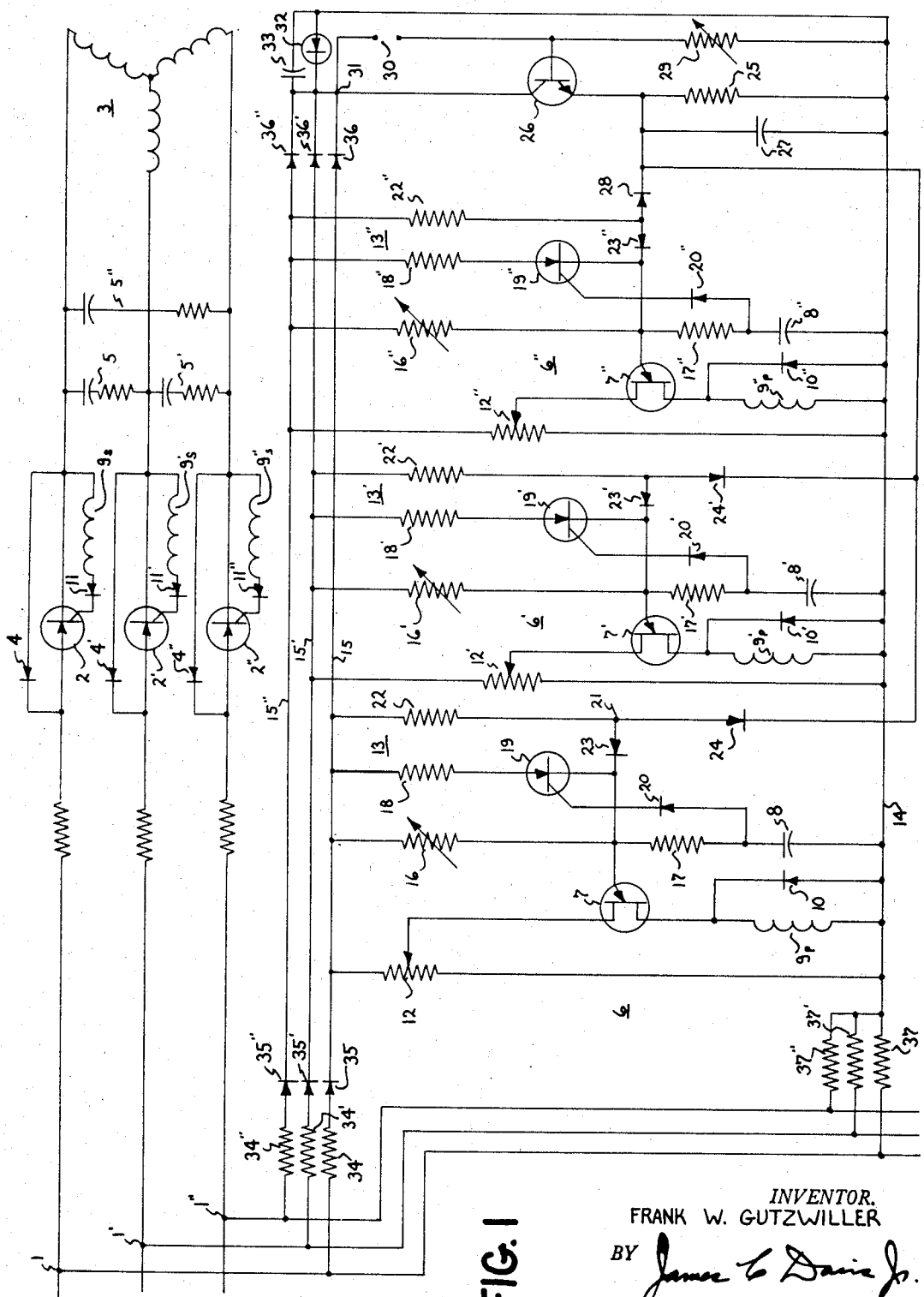
FIGURE 1 is a schematic diagram showing one embodiment of this invention.

The circuit shown in FIGURE 1 generally comprises a power control circuit wherein power is controllably supplied from a polyphase power source (not shown) and through terminals 1, 1', and 1" and controlled rectifiers 2, 2', and 2" which controllably supply power to an inductive load 3. In the present embodiment of this invention the load is shown as a three-phase motor; however, this is only by way of example and is not intended as a limitation in the application of this invention. Power diodes 4, 4', and 4" are connected in back-to-back relationship with the controlled rectifiers 2, 2', and 2", respectively, to provide a return path for current from the load. RC filter circuits 5, 5', and 5" are connected between the power lines to reduce the inductive transients applied to the various controlled rectifiers and to provide a source of holding current for the controlled rectifiers.

Each of the controlled rectifiers has a corresponding trigger circuit which causes it to fire the controlled rectifier at some phase delay angle $\alpha$ with respect to the voltage supplied to the controlled rectifier. The trigger circuits 6, 6', and 6" correspond to the controlled rectifiers 2, 2', and 2", respectively. The trigger circuit 6 is described below and its operation explained. Corresponding circuit components in the trigger circuits 6' and 6" are numbered accordingly without being individually recited.

The trigger circuit 6 generally includes a discharging device comprising a voltage triggered negative resistance device, shown as unijunction transistor 7, which discharges a reactive means comprising a capacitance 8 whenever the magnitude of the voltage at the emitter electrode of the unijunction transistor reaches the standoff voltage ratio of this transistor multiplied by the interbase voltage magnitude, as is well known. The capacitor 8 is discharged through one part of a coupling means between the trigger circuit and the gate circuit of the controlled rectifier 2. In the described embodiment it is discharged through a primary winding $9_p$ of a pulse transformer 9. A diode 10 is coupled across the primary winding $9_p$ to act as a free-wheeling rectifier, suppressing induced voltages in the primary winding at the end of a discharge cycle. The voltage in the primary winding $9_p$ is coupled through the secondary winding $9_s$ in the gate circuit of the controlled rectifier 2 and through a diode 11 to fire the controlled rectifier 2.

In the trigger circuit 6 itself, a potentiometer 12 is conveniently provided to adjust the magnitude of voltage between the base 2 and base 1 electrodes of the unijunction transistor 7. The trigger circuit also includes means 13 for generating a phase-controlled train of pulses. The trigger circuit 6 is connected to the common, or neutral, point 14 and is powered by half-wave rectified, regulated voltage at a line 15. Charging current for the capacitor 8 is coupled through a conveniently adjustable rheostat 16 and a resistor 17. A resistor 18 and a lower power silicon-controlled rectifier 19, or other kind of latching switch, shunts the rheostat 16 whenever current flow through a diode 20 fires the silicon-controlled rectifier 19.

Means are provided for simultaneously controlling the firing angle $\alpha$ of each of the controlled rectifiers 2, 2', and 2". An initial voltage is maintained at a junction 21 by means of a resistor 22, diodes 23 and 24, a resistor 25, and a transistor 26. The diode 24 both couples voltage changes to the junction 21 and isolates the trigger circuit 6 from the trigger circuits 6' and 6". A capacitor 27 filters the voltage maintained at a junction 28. The state of conduction of the transistor 26 can be controlled by means of a voltage applied across terminals 30 by an outside source of voltage and the effect of the control voltage is conveniently adjusted by rheostat 29. For example, where motor speed is being regulated, a voltage which varies with the speed may be applied across the terminals 30. Alternatively, a variable control current, impedance or other parameter representative of a sensed condition can be connected to terminals 30. The collector voltage for the transistor 26 is maintained at a junction 31 by means of a Zener diode 32 and a filter capacitor 33 connected from the junction 31 to the common point 14.

The trigger circuits receive power from the three-phase source by means of a plurality of coupling resistors which reduce the voltage from the level at the terminals 1, 1', and 1" and from the neutral point 14. Thus, power is coupled from the terminal 1 and through a resistor 34 and the diode 35 to the line 15 and through a decoupling diode 36 to the junction 31. The use of the diode 36, along with the corresponding diodes 36' and 36", allows the maintenance of a halfwave rectified, regulated voltage at each of the lines 15, 15', and 15" with the use of only a single Zener diode 32. The diodes 36, 36', and 36" prevent higher voltages from the other lines from affecting the voltage level at each of the respective lines. The resistors 37, 37', 37" are coupled from the terminals 1, 1', and 1" to the neutral point 14.

FIGURE 2 should be referred to with respect to the operation of the circuit shown in FIGURE 1. FIGURE 2(a) shows the phase-to-netural voltages at each of the terminals 1, 1', and 1". These voltages are numbered in accordance with the input terminals at which they appear. FIGURES 2(b), 2(c) and 2(d) show the gate signals generated for each phase by the trigger circuits 6, 6', and 6", respectively.

To fire the controlled rectifier 2, voltage is coupled from the terminal 1 through the resistor 34 and the diode 35 to the line 15 when the voltage at the terminal 1 is positive in polarity with respect to the neutral point 14.

The transistor 26 maintains a unidirectional voltage at the junction 28 having a magnitude which is dependent upon the conductivity state of that transistor, under the control of the voltage at the terminals 30. At the beginning of a positive half-cycle voltage on supply line 1, capacitor 8 quickly charges through resistor 22 to an initial voltage equal to the D-C voltage at junction 28. Further charging through resistor 22 is prevented by the clamping action of diode 24.

At the same time additional charging current is coupled through the relatively high impedance rheostat 16 to further charge the capacitor 8 through the resistor 17. Accordingly, the voltage across the resistor 17 is positive in polarity at the emitter of the unijunction 7 with respect to the capacitor 8. This biases the anode of the diode 20 with a negative voltage so that the diode 20 blocks current flow from the gate-cathode circuit of the silicon-controlled rectifier 19. When the voltage at the emitter reaches the peak point voltage level of the unijunction transistor 7, after a time duration referred to as the firing angle $\alpha$ in FIGURE 2(b), the capacitor 8 is discharged by the unijunction transistor 7 through the primary winding $9_p$. The first of the train of pulses comprising the phase 1 gate signal as seen in FIGURE 2(b), is coupled through the pulse transformer 9 to the secondary winding $9_s$ and through the diode 11 and the gate and cathode electrodes of the controlled rectifier 2. This pulse tends to turn on the controlled rectifier 2 and build up current through the terminal 1 and the cathode and anode electrodes of the controlled rectifier 2, provided the anode of this SCR is positive with respect to its cathode. Since the load 3 is an inductive load which may cause a phase shift between supply voltage and current, it is possible that the anode voltage on controlled rectifier 2 is not yet positive, in which case it will not turn on at this first pulse.

To insure that the controlled rectifier 2 is fired when required, a train of pulses is generated by the trigger circuit 6. As the capacitor 8 is discharged by the unijunction transistor 7, the polarity of the voltage across the resistor 17 reverses so that the diode 20 is now forward biased. Current flows through this diode and the gate and cathode electrodes of the controlled rectifier 19 to fire this controlled rectifier while the first firing pulse is being generated. The silicon-controlled rectifier 19 shunts the resistor 18 across the high impedance rheostat 16, abruptly and markedly reducing the time constant of this charging path. As a result a larger current flows through the resistor 17 to charge the capacitor 8 to the peak point voltage level of the unijunction 7 more quickly. The circuit then behaves as a relaxation oscillator and this second pulse and the succeeding pulses in the phase-controlled train of pulses are generated at time intervals that are relatively very short and substantially equal. They provide a rapid sequence of gate pulses so that controlled rectifier 2 will be triggered as soon as, or shortly after, its anode swings positive with respect to its cathode. The sequence of pulses also serves to keep the controlled rectifier in conduction until inductive load current builds up to the holding level.

This invention is not limited to the particular details of the embodiment illustrated, and it is contemplated that various modifications and applications thereof will occur to those skilled in the art. It is therefore intended that the appended claims cover such modifications and applications as do not depart from the direct spirit and scope of this invention.

What I claim as new and desire to secure by Letters Patent of the United States is:

1. A circuit for controlling the power supplied from a polyphase source to an inductive load, comprising in combination:
    (a) terminal means adapted to be connected to each phase of the source;
    (b) separate controlled rectifier means connected to each of said terminal means and to the load, said controlled rectifier means having gate circuit means;
    (c) separate trigger circuit means coupled to each of said controlled rectifiers and to its associated terminals for controlling the firing of said controlled rectifier in time relation to the voltage at said associated terminals;
    (d) each of said trigger circuit means including means for generating a phase-controlled train of pulses responsive to a sensed condition, means for coupling the train of pulses to said gate circuit of said controlled rectifier, the last-mentioned means and said gate circuit being so constructed and arranged that the power for said gate circuit is derived solely from the train of pulses; and
    (e) resistive means associated with each of said terminals and a common point, each of said resistive means having a first terminal connected to said associated terminals and a second terminal connected to said common point, and means for connecting said separate trigger circuit means to said common point.

2. A circuit as defined in claim 1 wherein said means for generating a phase-controlled train of pulses comprises a relaxation oscillator including a first impedance means, reactive means and a voltage triggerable negative resistance device; means for connecting said reactive means to said first impedance means and to said device, said reactive means being charged through said first impedance means until discharged by said device; second impedance means having a lesser impedance value than said first impedance means, means coupled to said reactive means and to said first and second impedance means to shunt said first impedance means with said second impedance means in response to the discharging of said reactive means during a cycle of the source voltage at said associated terminal whereby a phase-controlled train of pulses is generated.

3. A circuit according to claim 2 wherein said device comprises a unijunction transistor, said reactive means comprises a capacitance connected in the emitter circuit of said unijunction transistor, and said means for coupling said train of pulses comprises a pulse transformer.

4. A circuit according to claim 2 wherein said second impedance means includes a silicon-controlled rectifier having its gate electrode connected to a third impedance means which is connected in circuit with said reactive means so that a voltage developed across said third impedance means in response to the discharging of said reactive means fires said silicon-controlled rectifier.

5. A circuit as defined in claim 1 wherein each of said trigger circuit means includes first and second diode means, means for connecting said first diode means between an associated terminal and said generating means; a Zener diode; means for connecting each of said second diode means between said generating means and one terminal of said Zener diode; said second diode and the last-mentioned connecting means being so constructed and arranged that a clipped voltage is present at each of said generating means from said Zener diode.

6. A circuit for controlling the power supplied from a power source to an inductive load, comprising in combination:
(a) terminal means adapted to be connected to the source;
(b) controlled rectifier means connected to said terminal means and to the inductive load, said controlled rectifier means having gate circuit means;
(c) trigger circuit means coupled to said controlled rectifier and to said terminal means for controlling the firing of said controlled rectifier in time relationship to the voltage at said terminal means;
(d) said trigger circuit means including means for generating a train of pulses phase-controlled in response to a sensed condition; means for coupling the train of pulses to said gate circuit of said controlled rectifier, the last-mentioned and said gate circuit being so constructed and arranged that the power for said gate circuit is derived solely from the train of pulses; and
(e) said generating means comprising a relaxation oscillator having a first impedance means, reactive means, and a voltage triggerable negative resistance device; means for connecting said reactive means to said first impedance means and to said device, said reactive means being charged through said first impedance means until discharged by said device; second impedance means, means coupled to said reactive means and to said first and second impedance means to shunt said first impedance means with said second impedance means in response to the discharging of said reactive means during a cycle of the source voltage at said terminal means whereby a phase-controlled train of pulses is generated.

7. A circuit according to claim 6 wherein said device comprises a unijunction transistor, said reactive means comprises a capacitor connected in the emitter circuit of said unijunction transistor, and said means for coupling said train of pulses comprises a pulse transformer.

8. A circuit according to claim 6 wherein said second impedance means comprises a silicon-controlled rectifier having its gate electrode connected to a third impedance means which is connected in circuit with said reactive means so that a voltage developed across said third impedance means in response to the discharging of said reactive means fires said silicon-controlled rectifier.

9. A circuit for generating a train of pulses after a predetermined time, in response to the magnitude of a control voltage applied to the circuit comprising in combination:
(a) a relaxation oscillator adapted to be connected to a voltage source and comprising first impedance means, reactive means, and a voltage triggerable negative resistance device;
(b) means for connecting said reactive means to said first impedance means and to said device and for coupling said reactive means to the source of said control voltage, said reactive means being charged from said voltage source through said first impedance means and additionally charged in accord with the magnitude of said control voltage;
(c) second impedance means, means coupled to said reactive means and to said first and second impedance means to shunt said first impedance means with said second impedance means in response to the discharging of said reactive means through said device whereby a train of pulses is generated after the first discharging of said reactive means.

10. A circuit according to claim 9 wherein said means coupled to said reactive means comprises a silicon-controlled rectifier having its gate electrode connected to a third impedance means which is connected in circuit with said reactive means so that a voltage developed across said third impedance means in response to the discharging of said reactive means fires said silicon-controlled rectifier.

References Cited

UNITED STATES PATENTS

| | | | |
|---|---|---|---|
| 3,246,227 | 4/1966 | Strohmeier et al. | 321—45 XR |
| 3,332,008 | 7/1967 | Mueller et al. | 318—227 XR |
| 3,340,456 | 9/1967 | Lehry | 323—22 XR |
| 3,355,647 | 11/1967 | Braus | 318—227 XR |

ORIS L. RADER, *Primary Examiner.*

G. RUBINSON, *Assistant Examiner.*

U.S. Cl. X.R.

318—227, 230; 321—5; 323—24, 38